Aug. 19, 1941.    C. HOLM ET AL    2,252,931
BOTTLE FEED AND HOLDBACK MOTION
Filed Jan. 8, 1940    4 Sheets-Sheet 1
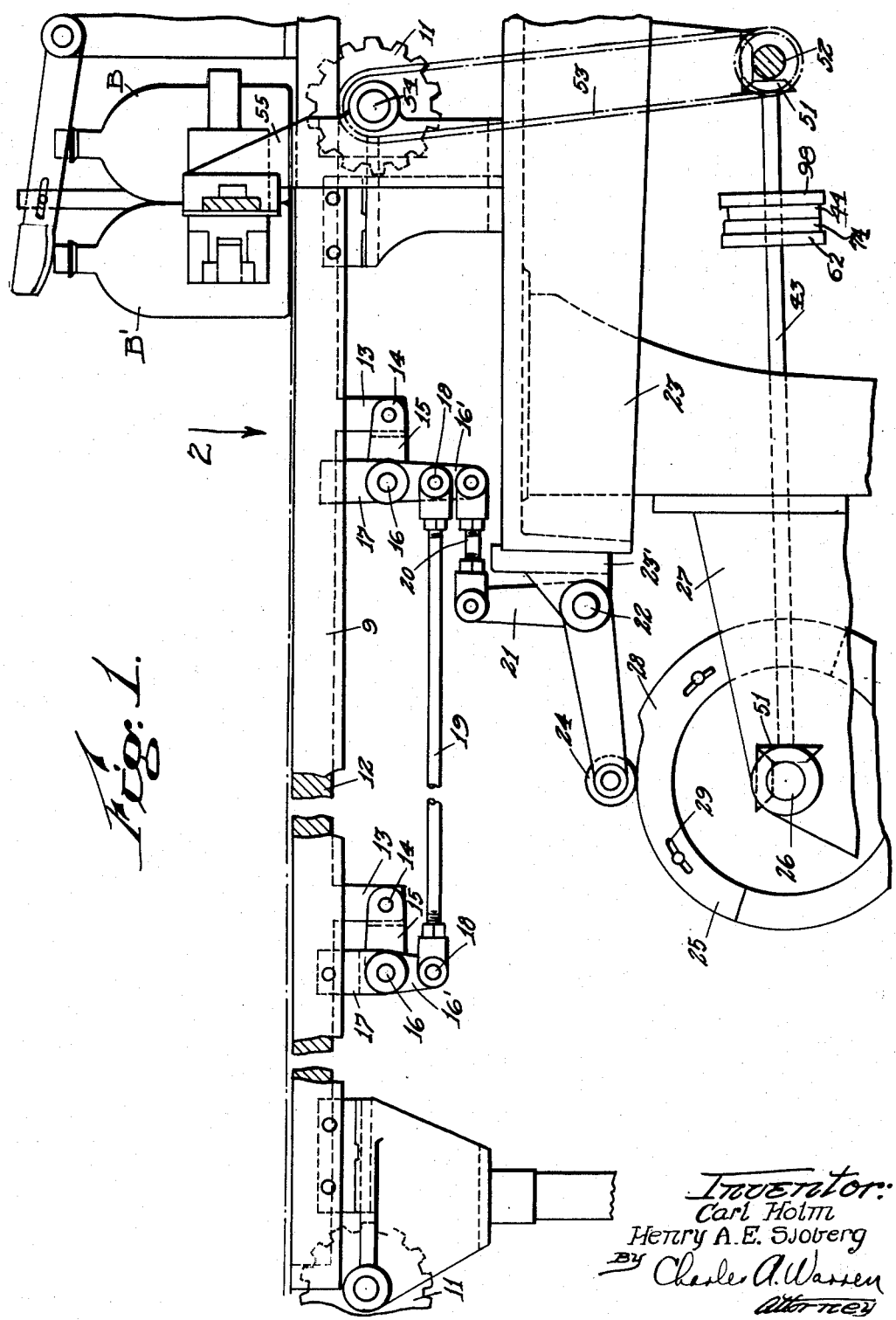
Inventor:
Carl Holm
Henry A. E. Sjoberg
By Charles A. Warren
Attorney

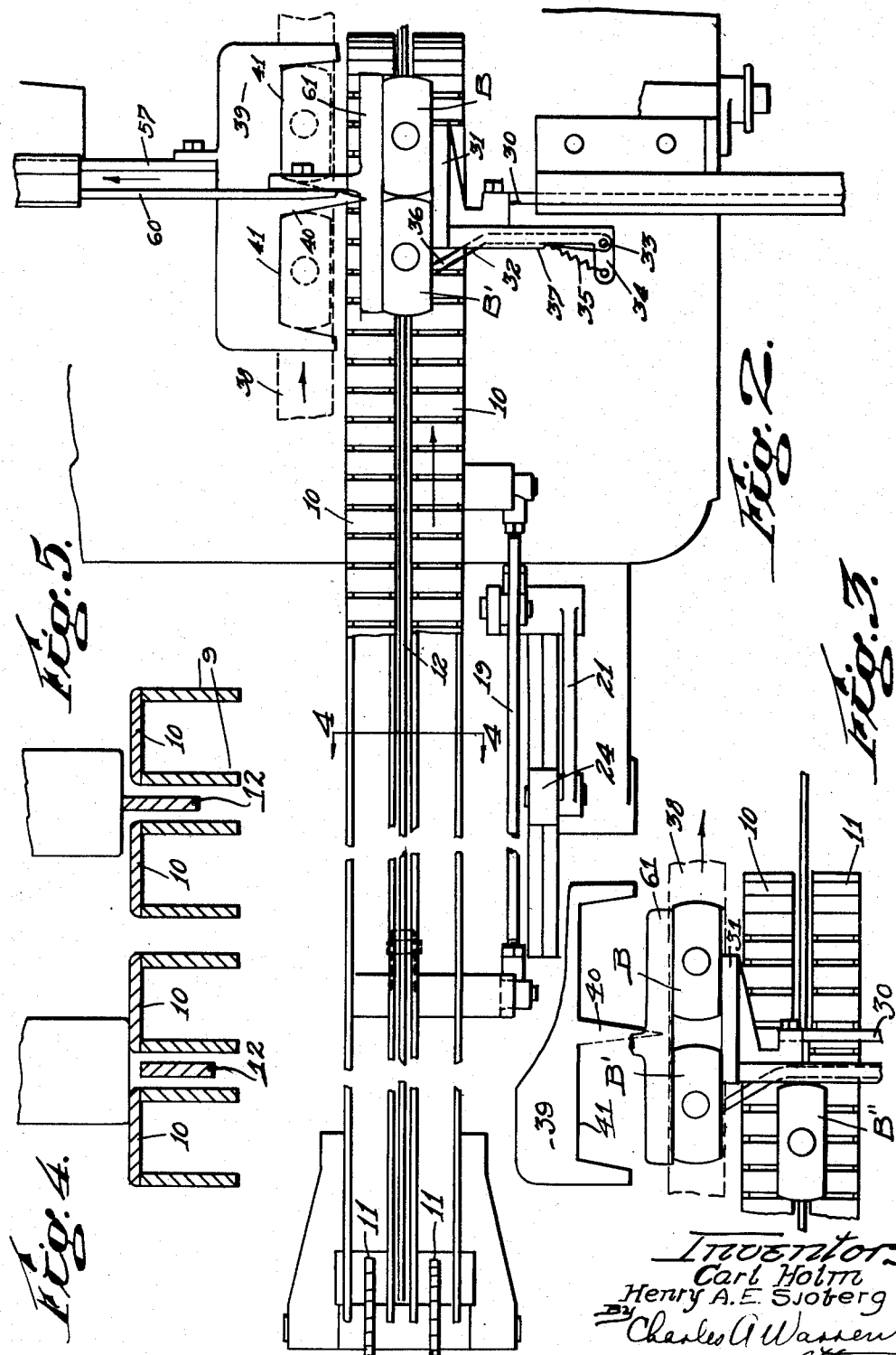

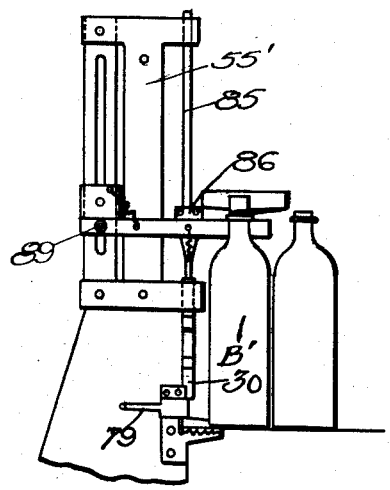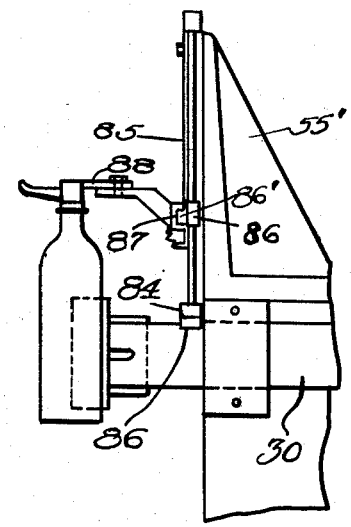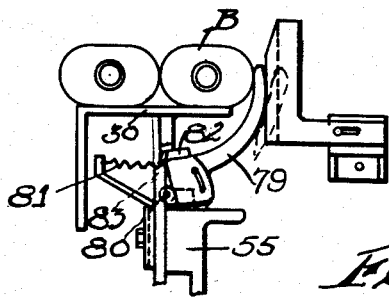

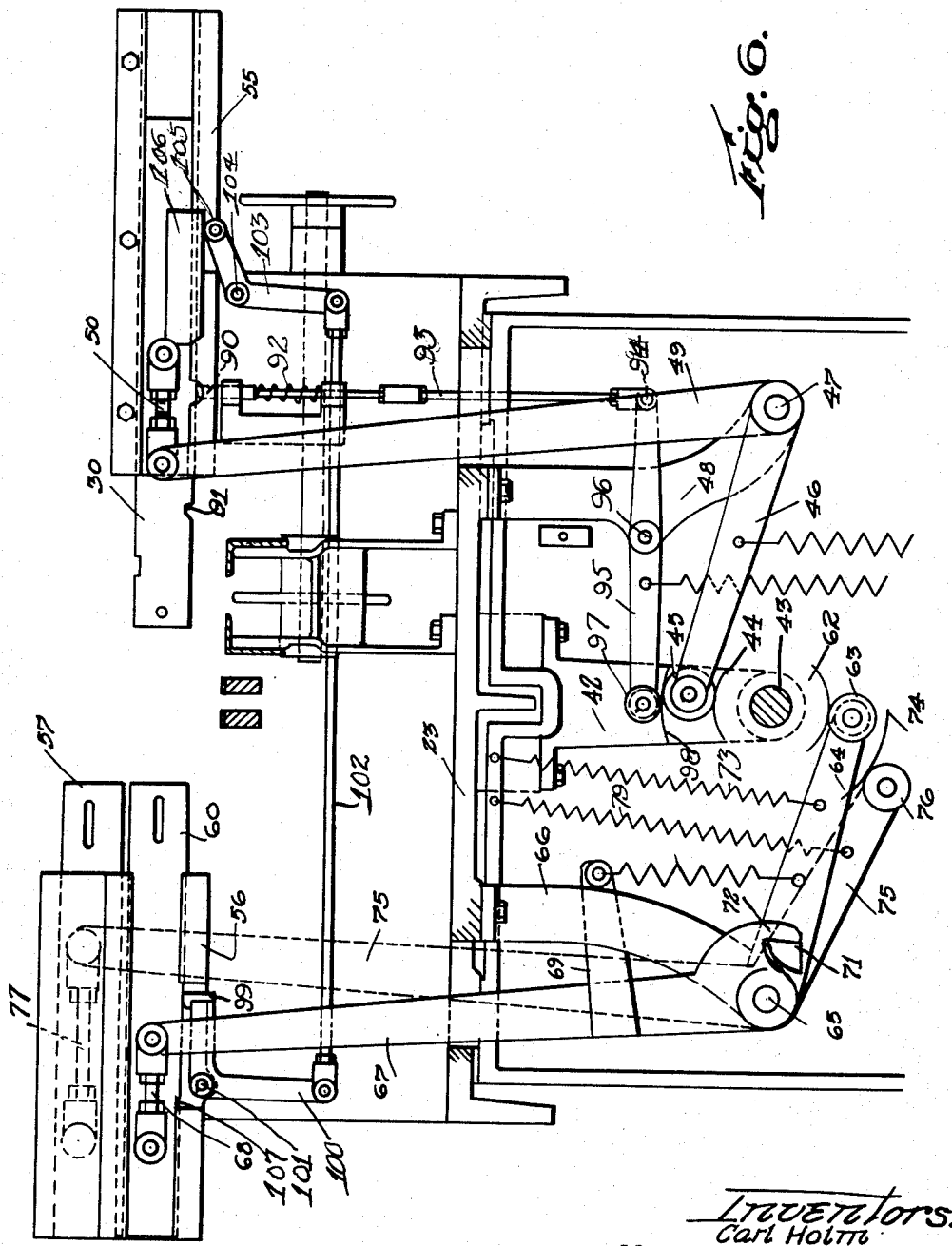

Patented Aug. 19, 1941

2,252,931

UNITED STATES PATENT OFFICE 2,252,931

BOTTLE FEED AND HOLDBACK MOTION

Carl Holm, Worcester, and Henry A. E. Sjoberg, North Grafton, Mass., assignors to Economic Machinery Company, Worcester, Mass., a corporation of Massachusetts Application January 8, 1940, Serial No. 312,818

13 Claims. (Cl. 198—24)

The present invention relates to a conveyor mechanism for bottles and the like and especially to a device by which bottles or other articles on a conveyor may be stopped in a predetermined position on the conveyor and advanced a predetermined distance along the conveyor. This application is a continuation-in-part of applicants' copending application, Serial No. 191,502, filed February 19, 1938, for Bottle feed and hold-back motion.

The principal object of the present invention is to provide for stopping of bottles or other articles in a predetermined position on a conveyor during the performing of an operation on the bottles, this operation being, for example, a sidewise removal of the bottles from the conveyor and a spacing of the bottles on an adjacent conveyor. The invention includes a structure by which all of the bottles on the conveyor may be stopped temporarily while the aforesaid operation is being performed on the leading bottle or bottles, without stopping the conveyor.

In order to reduce bottle cost as well as freight costs, and for other reasons, the amount of glass used in the manufacture of a bottle has been reduced more and more with the result that the bottles are more breakable and must be handled with greater care. When bottles are advanced intermittently along a conveyor, the banging of one bottle against the next is frequently enough to break the bottle. It is thus essential that the conveying mechanism and the associated apparatus be so constructed that the bottles may be moved as slowly and as gently as possible and to this end the invention involves, in combination with an intermittently operable conveyor mechanism, a device to allow a greater period of time between the successive advancing movements of the bottles. In this way relatively light weight bottles may be handled without injury. Other and further objects and advantages of the invention will more fully appear from the following detailed description taken in connection with the accompanying drawings, in which—

Fig. 1 is a side view of a device embodying the invention.

Fig. 2 is a plan view as indicated by the arrow 2 in Fig. 1.

Fig. 3 is a fragmentary plan view of a portion of the device of Fig. 2, with the parts in a different position.

Fig. 4 is a sectional view substantially along the line 4—4 of Fig. 2.

Fig. 5 is a view similar to Fig. 4, showing the parts in a different position.

Fig. 6 is a sectional view through the device.

Fig. 7 is a fragmentary plan view of a feature.

Fig. 8 is a fragmentary elevation of a control device.

Fig. 9 is a side elevation of the device of Fig. 8.

With reference to the drawings, two parallel conveyors 10 spaced from each other are supported by sprocket wheels 11, one of these wheels being suitably driven from a source of power, not shown. Between the two conveyors is located a bar or rest 12 which extends parallel to and adjacent to the upper surfaces of the conveyors. This bar has downwardly extending lugs 13 integral therewith and connected by pins 14 to the ends of arms 15. These arms 15 are mounted on spaced parallel shafts 16 for rotation with the shafts. Brackets 17 mounted on and depending from the same frame 9 that supports the conveyors provide supports for the shafts 16. On the forward end of each of the shafts 16, as best shown in Figs. 1 and 2, are mounted depending arms 16' having their lower ends connected by a link 19, suitable pivot pins 18 providing the connection between the link and the arms. The link 19 assures a movement of the entire rest 12 vertically at one time so that its upper surface remains horizontal and in parallel relation to the conveyor surfaces. One of the depending arms 16' is pivotally connected by an adjustable link 20 to a bell crank lever 21 mounted on a pin 22 journalled in the bracket 23' on the frame 23 of the machine.

The bell crank lever 21 has at the end opposite the adjustable link 20 a roller 24 which engages with and rides on a cam 25, the latter being mounted on a suitably rotated shaft 26. The shaft is journalled in a bracket 27 on the frame 23. The cam may be provided with an adjustable, removable and replaceable element 28 having the cam surface with which the roller 24 engages, the shape of this element controlling the motion of the bar 12, and thus the time during which the bottles are held against movement along the conveyor. This element 28 is adjustable circumferentially through arcuate slots 29 therein to bring the high point of the cam to predetermined positions angularly of the shaft 26. This adjustment times the motion of the bar 12 in accordance with the movements of the other parts of the machine, as will hereinafter appear.

The rest 12 is located, as above stated, in substantially parallel relation to the upper surfaces of the conveyors 10 and is normally slightly below their surfaces, as shown in Fig. 4, so that it does not interfere with the normal forward movement of bottles or other articles on the conveyors. The conveyors operate continuously and when the bar 12 is moved above the level of the upper surfaces of the conveyors through the action of the cam 25, the bottles or other articles are elevated by the bar, the width of which is sufficient to support the bottle, as shown in Fig. 5. The bottles are thus brought to rest without interfering with the continuous movement of the conveyor surfaces, and accordingly the bottles or other articles can move intermittently forward with the amount of forward movement dependent upon the speed of the conveyors 10 and the time during which the bar 12 is below the surfaces of the conveyors to allow the bottles to be carried forward.

Although only two bottles B and B' are shown in position in Figs. 1 and 2, it will be understood that there are several bottles in line along the conveyors. In the position of the parts as shown in Fig. 2, the bar 12 has been elevated to the position of Fig. 5 so that the bottles are stationary in readiness for an operation to be performed thereon. In the arrangement shown this operation consists of a transfer laterally of the two end bottles to a supplementary conveyor 38, the surface of which extends substantially parallel to the conveyors 10 and along which the bottles are carried forward for a labeling or other operation. To shift the leading bottle or bottles laterally from the conveyors 10 a transverse slide 30 is horizontally movable above the conveyors 10 and has mounted on the end thereof a bottle pusher 31. For purposes which will hereinafter more fully appear, the pusher is not of a sufficient width to assure a lateral movement of both of the bottles and thus at the side of the pusher is positioned a pivotally mounted lever 32 having an outwardly extending end 36 which increases the effective width of the face of the bottle pusher to assure a lateral movement of both of the bottles. The lever 32, as shown in Fig. 2, is mounted on a pin 33 on a bracket 34 attached to the slide 30, and a spring 35 normally holds the lever 32 in the position shown, a stop 37 on the bracket 34 limiting the movement of the lever.

The end 36 of the lever, as best shown in Fig. 2, extends beyond the edge of the pusher 31 in a direction opposite to the movement of the bottles on the conveyor, and thus the effective width of the face of the pusher is enough to assure a movement of both of the end bottles simultaneously off of the conveyor and into the position of Fig. 3. As the pusher returns from the position of Fig. 3 to its original position of Fig. 2, the spring 35 being very light in weight, allows the lever to move inwardly so that it will not interfere with a bottle located on the conveyor in the position of the bottle B'' of Fig. 3.

For actuating the slide 30 the base 23 of the machine has a bracket 42, Fig. 6, in which is journalled a cam shaft 43. A cam 44 on the shaft is in a position for engagement with a roller 45 on the end of an arm 46. This arm is mounted on a shaft 47 journalled in a bracket 48 and this shaft 47 has a second arm 49 thereon, the latter being connected by a link 50 to the slide 30.

The cam shaft 47 is driven in unison with the shaft 26 through a suitable gearing which may be a bevel gear connection 51 to assure an upward and downward movement of the bar 12 in timed relation to the movements of the slide 30. The cam shaft is also driven in timed relation to the movements of the conveyors 10 and the drive for this purpose may be a bevel gear connection 51 between the cam shaft 43 and the drive shaft 52 which is connected by a belt 53 to the shaft 54 on which one of the sprocket wheels 11 is mounted.

The slide 30 is reciprocable in a bracket 55 mounted on the frame 23 of the machine. On the opposite side of the conveyor belts 10 is located a bracket 56 in which a slide 57 is reciprocable. Each of these slides moves at a right angle to the direction of movement of the conveyor belts, as shown. The slide 57 has mounted on the end thereof a plate 39 having a wedge-shaped projection 40 centrally of the face thereof. On opposite sides of the projection are recesses 41 of a width to receive the bottles on the conveyor 10 and to assure a proper spacing of the bottles on the conveyor 38, as shown in Fig. 2. This plate 39 holds the bottles against endwise movement on the conveyor 38 until it is withdrawn from operative position, this withdrawal movement being effected by a movement of the slide 57.

In the same bracket 56 is a second slide 60, the latter having mounted on the end thereof a follower plate 61, the face of which extends parallel to the face of the pusher. The follower is adapted to move toward the pusher to define between the follower and pusher a space substantially the width of the bottles and into which the bottles are moved by the conveyor. The follower then moves with the pusher as the bottles are shifted from the main conveyor onto the conveyor 38 where they are spaced by the splitter plate 39.

For reciprocation of the slide 60 the cam shaft 43 has a cam 62 thereon engageable by a roller 63 on the end of an arm 64 turnable on a shaft 65 supported by a bracket 66. The same shaft also supports an arm 67, the end of which is connected by a link 68 to the slide 60. This arm 67 has a projecting lug 69 connected by a spring 70 to the arm 64 so that the slide 60 is resiliently urged into the operative position of Fig. 2. Movement of the slide into inoperative position is assured by cooperating lugs 71 and 72 on the arms 64 and 67 respectively. A spring 73 retains the cam roll in engagement with its cam.

The slide 57 is reciprocated by a cam 74 on the same cam shaft 43. A bell crank lever 75, turnable on the shaft 65, has a follower roll 76 in a position to engage with the cam 74. The end of the opposite arm of the bell crank lever is connected by a link 77 to the slide 57. A coil spring 78 holds the follower roll against the cam, as will be apparent.

In order to prevent movement of the pusher when the bottles to be shifted are not in a proper position, the pusher slide is held in an inoperative position by latches which are released only when the bottles are in the desired position on the conveyor. To this end, as shown in Fig. 7, an arm 79 is pivoted on a stud 80 supported by the bracket 55, and the end of this arm is in a position to be engaged by the leading bottle on the conveyor 10. A coil spring 81 normally holds this arm in the full line position shown, in which position a projecting lug 82 on the arm acts as a latch to engage an abutment 83 on the slide 30. When the leading bottle on the conveyor 10 is advanced to the proper position for a lateral discharge from the conveyor, the arm 79 is rocked into the dotted position of Fig. 7, thereby disengaging the latch to permit the movement of the slide 30.

As shown in Fig. 9, an additional latch 84 on the end of a vertically movable rod 85 engages in a notch 86 in the slide 30. The rod 85 has a plate 86 thereon, the latter carrying a projection 86' engageable in a slot 87 in an arm 88. This arm is pivoted on a pin 89 adjustably carried by a secondary bracket 55' on the bracket 55 and the free end of the arm is in a position to engage the next to the end bottle in line on the conveyor 10, as best shown in Fig. 8. The weight of the arm 88 normally holds the arm and rod in a position to prevent reciprocation of the slide 30. When the bottle is in a position beneath the end of the arm 88, however, the rod 85 is elevated and the slide 30 is free to move.

In addition to the two latches above described, the slide 30 is also held against reciprocation by a latch 90 engageable in a notch 91 in the slide. A coil spring 92 surrounding the rod 93 with which the latch 90 is integral, normally holds the latch in operative position. The lower end of the rod 93 is pivoted by a pin 94 to a lever 95 which in turn is pivoted on a pin 96 to the bracket 48. This lever has at the end opposite to the pin 94 a follower roll 97 engageable with a cam 98 on the cam shaft 43. Reciprocation of the slide 30 is thus possible only when the first and second bottles in line on the conveyor 10 are in the position shown in Figs. 1 and 2. It will be understood that even if the two bottles are in position, and have disengaged the corresponding latches, the slide 30 will still not be advanced until the proper point in the machine operation, at which time the cam 98 provides for withdrawal of the latch 90.

The follower slide 60 is also held in its advanced position by a latch 99 on the end of a bell crank lever 100. The latter is rockable on a pin 101 in the bracket 56 and the end of the lever opposite the latch is connected by a rod 102 to one end of a bell crank lever 103. This latter lever is pivoted on a pin 104 on the bracket 55 and the other end of this lever carries a follower roll 105 in a position to be engaged by a cam 106 on the slide 30. Thus, as the pusher slide begins its movement for a lateral shifting of the bottles from the main conveyor 10, the cam 106 engages and moves downwardly the roll 105, thereby disengaging the latch 99 from the notch 107 with which this latch normally engages.

In the operation of the machine the conveyors 10 move continuously in the direction of the arrow and the secondary conveyor 38 has its operative surface moving continuously in the direction of the arrow thereon. The bottles are intermittently advanced on the conveyors 10, their movement being interrupted by the periodic elevation of the horizontal bar 12 which elevates the entire row of bottles away from the conveyor surfaces, as shown in Fig. 5. During the periodic interruption of the advance of the bottles the pusher 31 is effective for shifting the bottles laterally from the conveyor 10 and onto the secondary conveyor 38 where they are spaced apart by the splitter 39. The adjustment of the cam 25 is such that the two leading bottles on the conveyor will be advanced from the dotted line position B' of the bottles into the full line position of Fig. 2.

As the bar 12 is elevated the pusher 31 begins its lateral movement for transferring the bottles to the conveyor 38. This movement is possible since the leading bottle has rocked the arm 79 to disengage the latch 82, and since the second bottle has elevated the arm 88 to disengage the latch 84. The cams for controlling the slide 30 and latch 90 are so timed that the latch is withdrawn just before the slide begins its movement to the left, Fig. 8.

As the slide 30 begins its movement to the left for pushing the bottles onto the secondary conveyor, the latch 99 for the follower slide 60 is released and the latter moves to the left with the slide 30, the bottles being positioned between the pusher and the follower. After the bottles are positioned on the secondary conveyor in the notches 41 of the splitter 39, the latter is withdrawn (to the left, Fig. 8) to allow the bottles to be advanced by the conveyor 38 without interference with the wedge 40. After the bottles have been advanced far enough by the conveyor 38 so that the splitter and follower may be returned to their original position they are both restored by their respective cams to their original position, that of the splitter being shown in full lines in Fig. 2, and that of the follower being shown in dotted lines in Fig. 8.

At the same time that the follower begins its return movement to original position the slide 30 carrying the pusher is also restored to its original position of Fig. 2. As this return movement begins, the bar 12 is lowered so that the bottles may be advanced on the conveyors 10, so that the successive bottles on the conveyor will be advanced into alinement with the pusher 31. It will be understood that the latches 82 and 84 are operative as soon as the slide 30 is restored to its original position, and prevent further movement of this slide until there are two bottles again in the full line position of Fig. 2.

It will be understood that the longer the period of time that the bar 12 may be in its lowered position, the greater is the length of time that the conveyors may have for moving the bottles from the dotted line position B', Fig. 2, into the full line positions of this figure. By providing a resilient lever 36 on the side of the pusher 31 it is possible for the conveyors to start the advance of the bottles before the pusher is entirely restored to its full line position, since the leading bottle on the conveyors may be advanced to the full line position of the bottle on the conveyors 10 of Fig. 3 without being interfered with by the pusher. The arm 36 being resiliently held in operative position, will rock clockwise into the dotted position of Fig. 3 to allow this arm to pass by the bottle on the conveyor 10. By providing for increasing the length of operative time of the conveyors 10 in advancing the bottles into the proper position for the pusher to function the bottles may be advanced at a comparatively slow rate and there is accordingly much less possibility for breakage or injury to the bottles. To avoid the necessity for accurate timing of the cam 25 it may be desirable in many instances to provide a stop 108 which extends across the conveyors 10 and is engageable by the leading bottle on the conveyor when that bottle reaches the full line position of Fig. 2.

Although the pusher 31 has been described with the arm 36 associated therewith it will be understood that a solid pusher may readily be used where the necessity for extremely slow movement of the bottles on the conveyor is not present; the resilient arm 36 is, however, desirable with light weight bottles, or with extremely large bottles, and is in such instances a very desirable feature.

We claim:

1. The combination with a conveyor for advancing articles thereon and a slide reciprocable laterally of the conveyor for the removal of a pair of articles simultaneously from the conveyor, of a pair of latches normally holding the slide in inoperative position, means engageable by one of the articles and associated with one of the latches for rendering said latch inoperative when said article is in a position to be removed from the conveyor, and other separate means engageable by the second article of the pair and associated with the other latch whereby said other latch is inoperative when the second article of the pair is in the proper position.

2. The combination with a conveyor for the advance of articles thereon, a slide reciprocable laterally of the conveyor for the removal of articles therefrom at a predetermined point, a follower in a position to oppose the slide and to hold the articles thereagainst during the lateral shifting movement, said follower being reciprocable in substantially parallel relation to the slide, of a latch for holding said follower against movement, and means on the slide for disengaging said latch as the slide begins its lateral movement.

3. The combination with a conveyor for the advance of articles thereon, a slide reciprocable laterally of the conveyor for the removal of articles therefrom at a predetermined point, a follower in a position to oppose the slide and to hold the articles thereagainst during the lateral shifting movement, said follower being reciprocable in substantially parallel relation to the slide, of a latch for holding said follower against movement, means on said slide for disengaging the latch as the slide begins its movement, and a second latch for holding said slide against movement, said second latch having means associated therewith for engagement by the article on the conveyor whereby said second latch is disengaged when the article is in a position to be removed from the conveyor.

4. The combination with a conveyor for the advance of articles, a slide reciprocable laterally of the conveyor for the removal of articles therefrom and a second conveyor onto which the articles are delivered by the slide, of a splitter reciprocable laterally of the first conveyor and in a position to receive the articles from the slide as they are delivered to the second conveyor, said splitter by its reciprocation being withdrawn after positioning the articles to permit advance of the articles by the second conveyor.

5. The combination with a conveyor for the advance of articles thereon, a slide reciprocable laterally of the ocnveyor for the discharge of a plurality of articles simultaneously therefrom, and a second conveyor onto which the articles are discharged, of a splitter also reciprocable laterally of the first conveyor and in a position to receive the articles delivered onto the second conveyor by the slide, said splitter having wedge-shaped elements engageable between the articles for spacing the articles on the second conveyor, said splitter by its reciprocation being withdrawn from operative position to provide for the advance of the articles on the second conveyor after they have been delivered thereto and spaced thereon.

6. The combination with a conveyor for the advance of articles substantially horizontally and a slide reciprocable laterally of the conveyor for the removal of articles therefrom at a predetermined point, of a bar positioned beneath the articles on the conveyor and movable vertically with reference to the conveyor surface for elevating the articles from the conveyor and thereby stopping their advancing movement, and means for reciprocating said bar in timed relation to the movements of the slide.

7. The combination with a conveyor for the advance of articles substantially horizontally and a slide reciprocable laterally of the conveyor for the removal of articles therefrom at a predetermined point, of a bar positioned beneath the articles on the conveyor and movable vertically with reference to the conveyor surface for elevating the articles from the conveyor and thereby stopping their advancing movement, means for reciprocating said bar in timed relation to the movements of the slide and a pivoted arm on said slide with its free end substantially in the plane of the face of the slide and projecting in a direction opposite to the movement of articles along the conveyor, said arm thereby increasing the effective width of the face of the slide for the discharge of articles from the conveyor and by its position permitting the advance of articles by the conveyor before the slide has reached a position out of line with said article.

8. The combination with an intermittently operative horizontal conveyor, of a device for removing articles laterally therefrom, said device including a pusher element, the face of which is engageable with the article, and a lever pivoted to said element and having a projecting end in substantially the same plane as the face of the pusher element for extending the effective width of said face said projecting end extending beyond the edge of the element in a direction opposite to which the articles are moved on the conveyor, means for resiliently holding said lever in extended position, and means for operating the pusher in timed relation to the movements of the conveyor, whereby the conveyor may begin the advancing movement of the articles thereon before the pusher is retracted, the lever being pushed into retracted position by the articles as they are advanced by the conveyor.

9. The combination with an intermittently operative horizontal conveyor, of a device for transferring articles off the conveyor, said device comprising a pusher element engageable with a pair of articles simultaneously and less wide than the width of the pair of articles, and a lever pivoted to said element and having a free end thereof substantially in the plane of the face of the pusher element, but extending beyond the side edge thereof to increase the effective width of the pusher face, thereby assuring a movement of both of the articles simultaneously said projecting end extending beyond the edge of the element in a direction opposite to which the articles are moved on the conveyor, means for resiliently holding said lever in extended position, and means for operating the pusher in timed relation to the movements of the conveyor, whereby the conveyor may begin the advancing movement of the articles thereon before the pusher is retracted, the lever being pushed into retracted position by the articles as they are advanced by the conveyor.

10. The combination with a horizontal conveyor, a device for removing articles laterally therefrom, said device including a pusher element, the face of which is engageable with the article, and a lever pivoted to said element and having a projecting end in substantially the same plane as the face of the pusher element for extending the effective width of said face, of a member against which the article is pushed, said member having a notch therein to receive the article, said member being reciprocable to withdraw said member from operative position after the article has been properly located.

11. In a device for moving a pair of articles laterally from a conveyor, the combination with a reciprocable slide having a pusher element for transferring both articles laterally from the conveyor, of a receiving member having a wedge-like projection adapted to enter between the articles engaged by the pusher, thereby separating said articles.

12. In a device for moving a pair of articles laterally from a conveyor, the combination with a reciprocable slide having a pusher element for transferring both articles laterally from the conveyor, of a receiving member having a wedge-like projection adapted to enter between the articles engaged by the pusher, thereby separating said articles, said receiving member being reciprocable for movement into and out of operative position.

13. The combination with a conveyor, a slide reciprocable laterally of the conveyor for the removal of articles therefrom and a pair of latches normally holding said slide against movement, of means connected to one of said latches and in a position to be engaged by an article on the conveyor for disengaging said latch when the article is in a position to be engaged by the slide, means for procuring reciprocation of the slide, and means operative in timed relation to said last means for disengaging the second latch.

CARL HOLM.
HENRY A. E. SJOBERG.